United States Patent [19]

Thompson et al.

[11] Patent Number: 5,449,704
[45] Date of Patent: Sep. 12, 1995

[54] PHOTOPOLYMERISABLE LIQUID COMPOSITIONS COMPRISING RESOL AND AMINOTRAIZINE RESINS

[75] Inventors: Stuart J. Thompson, Great Shelford; Stuart Mansfield, Sawston, both of England

[73] Assignee: Ciba-Geigy Corporation, Ardsley, N.Y.

[21] Appl. No.: 166,763

[22] Filed: Dec. 14, 1993

[30] Foreign Application Priority Data

Dec. 19, 1992 [GB] United Kingdom ............... 9226527

[51] Int. Cl.$^6$ ............................ C08J 5/14; C08F 2/50; C08G 65/40; C08G 71/04
[52] U.S. Cl. .................. 522/94; 522/100; 522/105; 522/96; 522/103; 522/107; 523/149; 523/156; 523/158
[58] Field of Search ............ 522/94, 16, 19, 100, 522/105; 523/149, 156, 158

[56] References Cited

U.S. PATENT DOCUMENTS

| | | | |
|---|---|---|---|
| 3,326,825 | 6/1967 | Clougherty et al. | 260/14 |
| 4,024,113 | 5/1977 | Ammons | 260/77.5 AM |
| 4,101,500 | 7/1978 | Brodsky | 523/149 |
| 4,140,605 | 2/1979 | Sano et al. | 522/105 |
| 4,368,300 | 1/1983 | Nakano et al. | 522/103 |
| 4,370,403 | 1/1983 | Takaki | 522/121 |
| 4,409,077 | 10/1983 | Sakiyama et al. | 522/105 |
| 4,634,602 | 1/1987 | Sirkoch et al. | 522/94 |
| 4,659,788 | 4/1987 | Ohta et al. | 522/94 |
| 4,767,535 | 8/1988 | Hentschel et al. | 210/500.38 |

FOREIGN PATENT DOCUMENTS

| | | |
|---|---|---|
| 0361978 | 4/1990 | European Pat. Off. . |
| 0522736 | 1/1993 | European Pat. Off. . |
| 1575361 | 9/1980 | United Kingdom . |
| 1133834 | 11/1988 | United Kingdom . |

OTHER PUBLICATIONS

Derwent Abstract JP 054494869, Jun. 2, 1978.

*Primary Examiner*—Susan W. Berman
*Attorney, Agent, or Firm*—William A. Teoli, Jr.

[57] ABSTRACT

A liquid composition which on exposure to actinic radiation polymerises to form a heat-curable solid film adhesive, said composition comprising (A) a heat-curable phenol-aldehyde resol resin, (B) a photopolymerisable resin having, on average, more than one polymerisable acrylic group per molecule, (C) a photopolymerisation initiator for (B) and (D) an aminotriazine-formaldehyde resin.

13 Claims, No Drawings

PHOTOPOLYMERISABLE LIQUID COMPOSITIONS COMPRISING RESOL AND AMINOTRAIZINE RESINS

This invention relates to liquid compositions which are photopolymerisable to give solid heat-curable adhesives and to adhesives thereby obtained, which are particularly suitable for use in bonding friction materials such as brake linings to metal.

Phenol-aldehyde resin adhesives have often been used in the form of solid films in structural bonding applications, for example in the aerospace industry. Use of adhesives in this form eliminates difficulties which may occur when a liquid adhesive is used, such as evaporation of solvent, loss of adhesive from the required bonding area and uneven distribution of adhesive over the surfaces to be bonded.

One conventional method of producing film adhesives involves dissolving a solid resin composition in a volatile organic solvent, pouring the resulting solution onto a flat surface and then evaporating the solvent to leave a film of the resin composition. In another conventional method of making a film adhesive, a solid resin composition is heated to its melting point, extruded through a narrow slit and then cooled to form a solid film.

These conventional methods have associated disadvantages. Use of a volatile solvent usually gives rise to toxicity and/or flammability problems, while evaporation of the solvent has expensive energy requirements and solvent recovery plant has to be installed if costly wastage is to be avoided. Heating, whether for evaporation of the solvent or to melt a solid composition prior to extrusion, often results in advancement (polymerisation) of the resin, shortening the shelf life of the resulting film adhesive and leading to its premature cure.

In GB 1575361, there is proposed a method of making a phenol-aldehyde resin film adhesive which avoids the above mentioned disadvantages. In that method, a liquid composition containing a phenol-aldehyde resin and a photopolymerisable compound is photopolymerised to form an essentially solid continuous film which is still thermally curable. Amongst the many different photopolymerisable compounds suggested for use in the method of GB 1575361 are various acrylic monomers and epoxide resin-derived acrylates. The cited specification indicates that the film adhesives obtained by that method are suitable for bonding metals such as aluminium and stainless steel, glass, ceramics and wood.

There is a need for a heat-curable phenolic resin film adhesive which can be produced without the need to evaporate solvents or to use extrusion but which can meet the difficult physical property requirements of an adhesive for bonding friction materials such as brake linings to metal. In particular, there is a need for an adhesive which can be applied to a surface, e.g. a surface of a metal substrate to be bonded to a brake lining, in a form which is liquid at ambient temperatures and which is free from volatile organic solvents, but which can be readily convened into a solid heat-curable film capable of providing effective bonding of brake linings to metal.

Accordingly, the present invention provides a liquid composition which on exposure to actinic radiation polymerises to form a heat-curable solid film adhesive, said composition comprising (A) a heat-curable phenol-aldehyde resol resin, (B) a photopolymerisable resin having, on average, more than one polymerisable acrylic group per molecule, (C) a photopolymerisation initiator for (B), and (D) an aminotriazine-formaldehyde resin.

The present invention also provides a heat-curable solid film adhesive obtained by exposing to actinic radiation a layer of a composition of the invention as hereinbefore defined.

The present invention further provides a method of bonding a surface of friction material to a metal surface which comprises bringing said surfaces together with a film adhesive of the invention as hereinbefore described between and in contact with said surfaces, and heating the resulting assembly to cure the film adhesive.

Phenol-aldehyde resols suitable for use as component (A) of the liquid composition are available commercially or may be produced by well known procedures. They are conventionally prepared by reacting a phenol, usually phenol itself, with an aldehyde, usually formaldehyde, in the presence of a base, for example an alkali metal hydroxide, aqueous ammonia or a tertiary amine such as triethylamine. Preferably (A) is a phenol-formaldehyde resol, which may have a phenol:formaldehyde molar ratio of from 1:1.0 to 1:2.5. Especially preferred phenol-formaldehyde resols are those having a phenol:formaldehyde molar ratio from 1:1.5 to 1:2.5.

In general, as the water content of the resol is reduced, the strength of a bond formed using the adhesive of the invention is increased. Preferably, the water content is below 15%, especially 10% or less, by weight of the resol. If, as is frequently so, the resol as initially prepared has a higher water content than desired, water can be removed, usually by evaporation under vacuum, until the water content is reduced to the desired level.

The photopolymerisable resin (B) may be an oligomer or polymer having, on average, more than one polymerisable acrylic group per molecule. Preferred such oligomers and polymers are polyurethane acrylates, polyester acrylates and acrylated epoxide resins having, on average, more than one polymerisable acrylic group per molecule, the polyurethanes being particularly preferred. Mixtures of one or more such polyurethanes and/or one of more such polyesters and/or one or more such acrylated epoxide resins can be used as component (B) in compositions of the invention.

Suitable photopolymerisable polyurethanes include reaction products of a polyisocyanate, i.e. a material having, on average, more than one isocyanate group per molecule, with a substance having at least one hydroxyl group and at least one polymerisable acrylic group. For example, such a polyurethane may be a reaction product of an aliphatic or cycloaliphatic diisocyanate and an adduct of an epoxide resin, such as 1,4-butanediol diglycidyl ether, with acrylic acid or methacrylic acid. Alternatively, such a photopolymerisable polyurethane may be a reaction product of a polyol, i.e. a material having, on average, more than one hydroxyl group per molecule, with a substance having at least one isocyanate group and at least one polymerisable acrylic group; for instance, (B) may be a reaction product of a polyoxyalkylene glycol with 2-isocyanatoethyl methacrylate.

A preferred class of photopolymerisable polyurethane is a reaction product of (I) an isocyanate-terminated polyurethane prepolymer with (II) a hydroxyl group—containing acrylic compound. Isocyanate-terminated polyurethane prepolymers are available commercially or may be obtained by well established procedures. They may be prepared, for example, by reaction of a polyol, such as a hydroxy-terminated polyether or polyester, or a polyamine, such as a polyoxyalkylene polyamine, with a stoichiometric excess of a polyisocyanate, such as an aliphatic or cycloaliphatic polyisocyanate.

A preferred isocyanate-terminated prepolymer (I) is a reaction product of a polyoxyalkylene glycol with a diisocyanate. Suitable polyoxyalkylene glycols include polyoxyethylene glycols, polyoxypropylene glycols, polyoxytetramethylene glycols, polyoxyalkylene glycols obtained by reacting diols such as 1,4-butanediol, neopentyl glycol or 1,6-hexanediol with ethylene oxide or propylene oxide, and mixtures of two or more thereof; polyoxyethylene glycols and polyoxypropylene glycols are preferred, especially those having a molecular weight of 1000 or more.

The diisocyanate reacted with the polyoxyalkylene glycol may be an aliphatic diisocyanate such as 1,2-propylene-, 1,3-propylene,-1,2-butylene-, 1,4-butylene-, pentamethylene-, hexamethylene-, 2,4,4-trimethylhexamethylene-, 2,2,4-trimethylhexamethylene- and dodecamethylene- diisocyanates; cycloaliphatic diisocyanates such as 1,3-cyclohexylene- and 1,4-cyclohexylene- diisocyanates, methyl-2,4-cyclohexylenediisocyanate, methyl- 2,6-cyclohexylenediisocyanate, 1,3-bis-(isocyanatomethyl) cyclohexane, 1,4-bis-(isocyanatomethyl) cyclohexane, 3-isocyanatomethyl-3,5,5-trimethylcyclohexylisocyanate (isophorone diisocyanate), and 4,4'-methylenebis(cyclohexylisocyanate); and aromatic diisocyanates such as m- and p-phenylene diisocyanates, 2,4- and 2,6- tolylenediisocyanates, 1-chloro-2,4-diisocyanatobenzene, 1,4-naphthalenediisocyanate, 4,4'-diphenylmethanediisocyanate and 4,4'-diphenylether diisocyanate. Mixtures of two or more of the above diisocyanates can be used. Amongst these diisocyantes, cycloaliphatic diisocyanates are preferred, especially isophorone diisocyanate.

The hydroxyl-containing acrylic compound (II) is preferably a hydroxyalkyl acrylate or hydroxyalkyl methacrylate such as 2-hydroxyethyl acrylate, 2-hydroxypropyl acrylate, 3-hydroxypropyl acrylate, 4-hydroxybutyl acrylate and the corresponding methacrylates. An especially preferred compound is 2-hydroxyethyl methacrylate.

Reaction of the isocyanate-terminated prepolymer (I) with the hydroxyl-containing acrylic compound (II) to give the photopolymerisable polyurethane may be carried out using conventional procedures, for example by heating at 30°–110° C. in the presence of a polymerisation inhibitor such as hydroquinone.

Suitable photopolymerisable polyesters include polyesters modified after formation by a reaction to introduce, on average, more than one acrylic group per molecule. For example, such a polyester may be a reaction product of a hydroxyl-terminated polyester with an acrylic compound having a hydroxyl-reactive group which is a carboxyl group, a carboxylic acid halide group or an epoxide group.

Hydroxyl-terminated polyesters which may be acrylated as hereinbefore described include reaction products of dihydric alcohols with a stoichiometric deficiency of dicarboxylic acids or their anhydrides or halides. Suitable dihydric alcohols for the preparation of such polyesters include alkylene glycols such as ethylene glycol, 1,2-propylene glycol, 1,3-propylene glycol, 1,4-butanediol, neopentyl glycol, and 1,6-hexanediol; oxyalkylene glycols such as reaction products of the above mentioned alkylene glycols or dihydric phenols with ethylene oxide or propylene oxide, diethylene glycol, triethylene glycol, higher polyoxyethylene glycols, dipropylene glycol, tripropylene glycol, higher polyoxypropylene glycols and polyoxytetramethylene glycols (polytetrahydrofurans). Suitable dicarboxylic acids and anhydrides for the preparation of such polyesters include aliphatic acids and anhydrides such as succinic acid, succinic anhydride, glutaric acid, glutaric anhydride, adipic acid, pimelic acid, suberic acid, azelaic acid, sebacic acid, maleic acid, maleic anhydride and fumaric acid; cycloaliphatic acids and anhydrides such as tetrahydrophthalic acid, hexahydrophthalic acid and their anhydrides; and aromatic acids and anhydrides such as phthalic acid, phthalic anhydride, isophthalic acid and terephthalic acid.

Other hydroxyl-terminated polyesters which may be acrylated as hereinbefore described are reaction products of polyhydric alcohols or alkylene oxides with carboxyl-terminated polyesters, which carboxyl-terminated polyesters may be reaction products of dihydric alcohols such as those hereinbefore mentioned with a stoichiometric excess of dicarboxylic acids or anhydrides such as those mentioned above or reaction products of a dicarboxylic acid or anhydride such as those mentioned above with a hydroxyl-terminated polyester derived from a dihydric alcohol and dicarboxylic acid or anhydride as described above. Suitable polyhydric alcohols for reaction with a carboxyl-terminated polyester to give a hydroxyl-terminated polyester include the dihydric alcohols mentioned above and higher functional polyhydric alcohols such as trimethylolethane, 1,1,1-trimethylolpropane, pentaerythritol, dipentaerythritol, sorbitol and adducts of such higher functional alcohols with ethylene oxide or propylene oxide. Suitable alkylene oxides for reaction with carboxyl-terminated polyesters to give hydroxyl-terminated polyesters are ethylene oxide and propylene oxide.

The hydroxyl-reactive acrylic compound reacted with the hydroxyl-terminated polyester to form a photopolymerisable polyester may be acrylic acid, acryloyl chloride, methacrylic acid, methacryloyl chloride, glycidyl acrylate, glycidyl methacrylate, a reaction product of 1 mol of a hydroxyalkyl acrylate or a hydroxyalkyl methacrylate with 1 mol of a dicarboxylic acid anhydride or an acid halide of such a reaction product. Preferably, the hydroxyl-reactive acrylic compound is acrylic acid, methacrylic acid, acryloyl chloride or methacryloyl chloride.

Other photopolymerisable polyester acrylates which can be used are reaction products of a carboxyl-terminated polyester with an acrylic compound having a carboxyl-reactive group which is a hydroxyl group or an epoxide group. Suitable carboxyl-terminated polyesters include those derived from a dihydric alcohol and a stoichiometric excess of a dicarboxylic acid or anhydride as hereinbefore described. Other suitable carboxyl-terminated polyesters are reaction products of hydroxyl-terminated polyesters, such as those described above, with a polycarboxylic acid or a halide or anhydride thereof, such as the dicarboxylic acids and anhydrides mentioned above and higher functional acids and anhydrides such as trimellitic acid, pyromellitic acid, benzophenone tetracarboxylic acid and their anhydrides. The carboxyl-reactive acrylic compound which is reacted with the carboxyl-terminated polyester to form a photopolymerisable polyester acrylate may be a hydroxyalkyl acrylate or a hydroxyalkyl methacrylate, such as 2-hydroxyethyl acrylate, 2-hydroxypropyl acrylate, 3-hydroxypropyl acrylate, 4-hydroxybutyl acrylate, and the corresponding methacrylates, glycidyl acrylate or glycidyl methacrylate.

Examples of suitable photopolymerisable polyester acrylates as hereinbefore described are given in U.S. Pat. No: 4,206,025, assigned to UCB. Suitable polyester acrylates are available commercially from UCB under the trade mark Ebecryl.

Suitable acrylated epoxide resins are adducts (esters) of acrylic acid or methacrylic acid with epoxide resins, which may be cycloaliphatic epoxide resins having epoxide groups attached to cycloaliphatic ring carbon atoms or, preferably, polyglycidyl ethers of polyhydric alcohols such as ethylene glycol, 1,2-propylene glycol, 1,3-propylene glycol, 1,4-butanediol, neopentyl glycol or glycerol, or polyglycidyl ethers of polyhydric phenols, particularly bisphenols such as bisphenol A or bisphenol F or phenolic novolak resins, and advancement products of such polyglycidyl ethers, i.e. advanced epoxide resins prepared by reacting such polyglycidyl ethers with difunctional reactants such as dihydric alcohols or dihydric phenols. Especially preferred acrylated epoxide resins are adducts of acrylic acid or methacrylic acid with a diglycidyl ether of bisphenol A.

In an especially preferred embodiment of the invention, the photopolymerisable resin (B) is a reaction product of an isocyanate-terminated polyurethane prepolymer from a polyoxypropylene glycol and isophorone diisocyanate with 2-hydroxyethyl methacrylate.

The photopolymerisation initiator (C) may be any of the known initiators for the photopolymerisation of acrylic materials. Thus (C) may be an aromatic carbonyl compound, for example a benzoin, a benzoin alkyl ether such as the isopropyl or n-butyl ether, an α-substituted acetophenone, for example a benzil ketal such as benzil dimethyl ketal, an α-haloacetophenone such as trichloromethyl p-tert butylphenyl ketone, an α-aminoacetophenone such as dimethylaminomethyl phenyl ketone and morpholinomethyl phenyl ketone, a dialkyloxyacetophenone such as diethoxyacetophenone, or an α-hydroxy-acetophenone such as 1-hydroxycyclohexylphenyl ketone or a benzophenone such as benzophenone itself and bis(4-dimethylamino) benzophenone; a metallocene, for example a titanium metallocene such as bis($\pi$-methylcyclopentadienyl) bis-($\sigma$-pentafluorophenyl) titanium (IV); a Group IVA organometallic compound, for example a stannane such as trimethyl benzyl stannane, tributyl benzyl stannane or dibutyl dibenzyl stannane, together with a photoreducible dye, typically methylene blue or rose bengal; a quinone, such as anthraquinone or camphorquinone, together with an amine having hydrogen attached to an aliphatic alpha carbon atom, preferably a tertiary amine such as bis(4-dimethylamino)- benzophenone and triethanolamine; a thioxanthone, for example an alkyl- or halogen- substituted thioxanthone such as 2-isopropylthioxanthone or 2-chlorothioxanthone; an acyl phosphine oxide; or a mixture of two or more thereof. Preferably, the photopolymerisation initiator is an α-substituted acetophenone or a mixture thereof with a thioxanthone or a benzophenone. In particularly preferred embodiments, the initiator is a benzil dialkyl ketal.

The aminotriazine-formaldehyde resin (D) is preferably a melamine-formaldehyde resin and may have from 2 to 6 N-methylol groups, part or all of which may be present as etherified N-methylol, for example N-($C_1$ to $C_6$ alkoxy)methyl, preferably N-butoxymethyl or, especially, N-methoxymethyl groups.

Preferred melamine-formaldehyde resins are at least partially etherified resins, especially methylated hexamethylolmelamines in which the degree of methylation of the methylol groups is 60 to 100%, more particularly 70–80%.

Such aminotriazine-formaldehyde resins may be prepared in a conventional manner by reacting the aminotriazine, preferably melamine, with the desired amount of formaldehyde under alkaline conditions and then, where an etherified resin is required, etherifying the resulting methylolmelamine, for example with a $C_1$ to $C_6$ alkanol, usually under acid conditions.

The liquid composition of the invention preferably also contains at least one liquid photopolymerisable acrylic monomer as reactive diluent. Such monomers are helpful in reducing the viscosity of the liquid composition to facilitate its application to a substrate or carrier for film formation. They can also result in the film adhesive having better penetration into a friction material to be bonded, thereby increasing the depth of the bonding zone. Liquid photopolymerisable acrylic monomers are available commercially or may be prepared by well known procedures. They include hydroxyalkyl esters of acrylic acid or methacrylic acid, such as 2-hydroxyethyl acrylate, 2-hydroxypropyl acrylate, 3-hydroxypropyl acrylate, 4-hydroxybutyl acrylate and the corresponding methacrylates; esters of acrylic acid or methacrylic acid with cycloaliphatic monohydric alcohols, especially polycyclic alcohols, for example isobornyl acrylate, dicyclopentenyl acrylate and corresponding methacrylates; esters of acrylic acid or methacrylic acid with polyhydric alcohols, including dihydric alcohols such as ethylene glycol, 1,2-propylene glycol, 1,3-propylene glycol, 1,3-butanediol, 1,4-butanediol, neopentyl glycol, 1,6-hexanediol, diethylene glycol, dipropylene glycol, triethylene glycol, tripropylene glycol and dimethylolcyclohexanes; trihydric alcohols such as glycerol, 1,1,1-trimethylolpropane and trishydroxyethyl isocyanurate; and polyhydric alcohols having four or more hydroxyl groups such as erythritol, pentaerythritol or dipentaerythritol. Mixtures of two or more of the above mentioned acrylic compounds can be used. Preferred reactive diluents are hydroxyalkyl esters of acrylic or methacrylic acid, or mixtures thereof with an ester of a polycyclic alcohol as described above or with a polyacrylate or polymethacrylate of a polyhydric alcohol. Especially preferred reactive diluents are 2-hydroxyethyl methacrylate or a mixture of 2-hydroxyethyl methacrylate and dicylopentenyl acrylate, 1,1,1-trimethylolpropane triacrylate, pentaerythritol triacrylate, or dipentaerythritol pentacrylate.

The toughness of an adhesive of the invention may be increased, if desired, by including in the liquid composition a polymeric toughening agent, for example a polytetrahydrofuran (i.e. a polytetramethylene glycol) or a polymer having repeating aromatic ether groups in the backbone thereof. Such polymers are available commercially or may be prepared by known procedures; they include polytetrahydrofurans end-capped with an aromatic hydroxycarboxylic acid, advanced, i.e. chain-extended, diglycidyl ethers of bisphenols such as bisphenol A, preferably having an epoxide equivalent weight of at least 200, phenoxy resins, polyphenylene oxides, aromatic polyetherimide resins and aromatic polyetheretherketone resins (PEEK resins). Preferred toughening agents are polytetrahydrofurans endcapped with p-hydroxybenzoic acid and having a number average molecular weight of 1500 to 2000, bisphenol A-advanced diglycidyl ethers of bisphenol A having an epoxide equivalent weight of at least 220, especially 230 to 300, and phenoxy resins derived from bisphenol A and epichlorohydrin having a molecular weight of 80,000 to 120,000.

In the liquid composition, the weight ratio of phenolic resol (A) to the total photopolymerisable acrylic material, i.e. the acrylic-containing resin (B) together with any other photopolymerisable acrylic material, is generally from 1:1 to 10:1, preferably from 2:1 to 5:1. The resol (A) is generally present in an amount of 50 to 90%, preferably 50 to 70%, by weight of the liquid composition. The photopolymerisable resin (B) is generally present in an amount of 5 to 30%, preferably 5 to 20%, by weight of the resol (A). When the liquid composition contains an acrylic monomer reactive diluent, it is generally present in an amount up to 30%, preferably 10 to 25%, by weight of the composition. The photopolymerisation initiator (C) is usually present in the composition in conventional amounts, generally from 0.1 to 20%, preferably 1 to 10%, by weight of the total photopolymerisable acrylic component of the liquid compositions, i.e. (B) together with any other photopolymerisable acrylic material. The amount of aminotriazine-formaldehyde resin (D) to be included in the liquid composition to give a film having suitable flexibility and tack may vary according to the nature and amounts of the resol (A), the photopolymerisable resin (B) and any optional components. A suitable amount of (D) can be determined readily by simple experiment; generally it is present in an amount of 2 to 30%, preferably 4 to 25%, by weight of the composition. Similarly, the amount of any toughening agent to be included in the composition may be chosen to give a desired degree of toughness; generally the toughening agent is present in an amount of 0.2 to 20%, more usually 1 to 10%, by weight of the liquid composition.

Minor amounts of conventional additives can be included in the liquid composition, if desired, provided they do not prevent photopolymerisation of the composition on exposure to actinic radiation. For instance, the composition may contain an inhibitor of thermal polymerisation such as hydroquinone or 2,6-di-tert-butyl-4-methylphenol or a dye to assist in assessing film quality.

In the production of a film adhesive, the liquid composition of the invention may be applied to a release surface, such as a sheet of silicone-coated paper, a polyolefin or a nylon, or to a surface to be bonded, in a layer 10 to 250, more usually 20 to 100, micrometres thick. In some instances, application of the liquid composition to a surface to be bonded or to a release surface may be made more convenient by heating the composition to reduce its viscosity. It will be appreciated, of course, that such heating should not increase the temperature of the composition to a level at which significant heat-curing would occur.

The layer of the composition of the invention on the surface to be bonded or the release surface is exposed to actinic radiation, generally of wavelength 200–600 nm, until it solidifies to form an essentially solid film. The selection, from commercially available equipment, of a suitable radiation source emitting radiation within this wavelength range is a routine matter for those skilled in the art of photopolymerisation. Suitable sources include medium pressure mercury arc lamps and metal halide lamps. The exposure time required may vary according to the nature of the photopolymerisable material, the proportion of that material in the composition, the type of radiation source and its distance from the composition. Suitable times may readily be determined by those familiar with photopolymerisation techniques. It will be understood, of course, that irradiation is carried out at a temperature below that at which substantial heat-curing would occur.

When the solid film adhesive is formed on a release sheet, it may be stored on this sheet, which acts as a strippable backing sheet, until required for bonding, when the release sheet is removed before sandwiching the film adhesive between the surfaces to be bonded.

Bonding together of surfaces is effected by bringing the surfaces together with the film adhesive between and in contact with the surfaces and heating the resulting assembly to cure the adhesive. Conveniently, one or both of the surfaces to be bonded may have the film adhesive formed thereon from a liquid composition of the invention. Thus the liquid composition may be applied to one or both surfaces in a conventional manner, e.g. by brush or roller, and irradiated as hereinbefore described to form a solid heat-curable adhesive film on the surface(s). The surfaces to be bonded can then be brought together and the resulting assembly heated to cure the adhesive. Where the film adhesive is formed on a release sheet, it may be cut to size before positioning between the surfaces. The temperatures and duration of heating required for thermal curing can readily be determined by routine experimentation and are easily derivable by those skilled in the art from what is already well known concerning the heat-curing of phenol-aldehyde resols. In general, cure temperatures from 120° C. to 180° C. can be used, although for some applications, particularly where shorter cure times are desired, temperatures of 200° to 300° C. can be used. Bonding may be facilitated, where desired, by heating the assembly to effect cure of the adhesive in a heated press.

The physical properties of the film adhesives of the invention render them particularly suitable for use in the bonding of friction materials such as brake linings to metals such as steel, for example in the production of brakes for the automotive and aircraft industries.

The invention is illustrated by the following Examples, in which parts are by weight unless indicated otherwise.

The photopolymerisable polyurethane used in the Examples is prepared as follows:

POLYURETHANE I

To isophorone diisocyanate (140 parts), through which nitrogen is bubbled, is added stannous octoate (0.45 part). The mixture is heated to 50° C. and Propylan D 2002, a polyoxypropylene glycol of molecular weight 2000 available from Harcros (176.5 parts) is added at 50°–55° C. over 30 minutes. Heating of the mixture at 50°–55° C. is continued for a further 3 hours. The nitrogen supply is then turned off and air is bubbled through the mixture. Hydroquinone (0.76 part) is added, followed by 2-hydroxyethyl methacrylate (144.8 parts) containing dissolved hydroquinone (1.47 parts) over 4 hours at 50°–55° C., cooling when necessary to maintain this temperature. The mixture is then heated at 50°–55° C. for a further 2 hours, by which time IR analysis indicates zero isocyanate content, before allowing it to cool to ambient temperature.

EXAMPLE 1

A liquid composition is prepared by mixing a phenol-formaldehyde resol having a phenol:formaldehyde molar ratio of 1:1.7, a viscosity (cone and plate) of 1.12 Pas to 3.23 Pas at 40° and a water content of 6% (120 parts), Polyurethane I (11 parts), 2-hydroxyethyl methacrylate (15.8 parts), dicyclopentenyl acrylate (11.8 parts), benzil dimethyl ketal (2.2 parts) and a methylated hexamethylolmelamine having a degree of methylation of 75% and a viscosity (DIN 53019/53214) of 10–25 Pas at 23° C. (39 parts). The liquid composition is applied to two mild steel sheets as a layer 36 micrometres thick. This layer is irradiated using a 300 w fusion lamp system and a Type D metal halide bulb at a distance of 15 cm for 10 passes using a conveyor belt travelling at 5 m/min, whereupon the layer solidifies to form a substantially tack-free heat-curable film adhesive. A lap joint assembly is formed with a brake lining inserted in the overlap (area 625 mm²) between the adhesive-coated steel sheets. The assembly is placed in a heated press at 150° C. under a pressure of 0.69K Pa for 30 minutes to cure the adhesive. The lap shear strengths of the resulting joints are shown below for different brake linings, each result being the average of 6 replicates.

| Brake Lining | Lap Shear Strength (MPa) | |
| --- | --- | --- |
| | 24° C. | 200° C. |
| Ferodo MR41 | 6.80 | 2.29 |
| Ferodo Valeo 154 | 4.74 | 1.75 |
| Ferodo 3608 | 2.00 | 1.40 |
| Ferodo 418 | 4.10 | 2.33 |
| Ferodo 3615 | 5.09 | 2.46 |
| Mintex Don 1393 | 3.09 | 2.73 |
| Mintex Don M24 | 5.60 | 3.19 |
| Mintex Don 8212 | 2.79 | 1.14 |

EXAMPLE 2

Example 1 is repeated using 1,1,1-trimethylolpropane triacrylate in place of the dicyclopentyl acrylate used in that Example. The lap sheer strengths of the resulting joints with an inserted Ferodo MR41 brake lining are 5.56 MPa at 24° C. and 2.20 MPa at 200° C.

EXAMPLE 3

Example 1 is repeated, replacing the dicyclopentenyl acrylate used in that Example by pentaerythritol triacrylate. The lap shear strengths of the resulting joints with an inserted Ferodo MR41 brake lining are 4.83 MPa at 24° C. and 2.03 MPa at 200° C.

EXAMPLE 4

Example 1 is repeated using dipentaerythritol pentacrylate in place of the dicyclopentenyl acrylate used in that Example. The lap shear strengths of the resulting joints with an inserted Ferodo MR41 brake lining are 5.46 MPa at 24° C. and 2.17 MPa at 200° C.

EXAMPLE 5

Example 1 is repeated, replacing the methylated hexamethylolmelamine used in that Example by Cymel 303, a methylated melamine-formaldehyde resin having a viscosity (DIN 53019/53214) of 3–6 Pas at 23° C., available from Dynocyanamid. The lap shear strengths of the resulting joints with an inserted Ferodo MR41 brake lining are 4.59 MPa at 24° C. and 3.31 MPa at 200° C.

EXAMPLE 6

A liquid composition is prepared by mixing a phenol-formaldehyde resol having a phenol:formaldehyde molar ratio of 1:1.7, a viscosity (cone and plate) of 1.12–3.23 Pas at 40° C. and a water content of 6% (228.5 parts), a methylated hexamethylolmelamine having a degree of methylation of 75% and a viscosity (DIN 53019/53214) of 10–25 Pas at 23° C. (18.6 parts), a p-hydroxybenzoic acid-capped polytetrahydrofuran having a number average molecular weight of 1608 and a viscosity of 8.48 Pas at 25° C. (55.6 parts), 2-hydroxyethyl methacrylate (30 parts), dicyclopentenyl acrylate (20.9 parts), Ebecryl 270—a urethane acrylate based on a reaction product of an aliphatic isocyanate-terminated prepolymer and a hydroxyalkyl acrylate and which is available from UCB (22.4 parts) and benzil dimethyl ketal (4.2 parts). The liquid composition is applied to two mild steel sheets as a layer 36 micrometres thick. This layer is solidified by irradiation as described in Example 1 and a lap joint assembly with inserted brake lining is formed as described in Example 1. The lap shear strengths of the resulting joints with an inserted Ferodo MR41 brake lining are 4.85 MPa at 24° C. and 3.22 MPa at 200° C.

EXAMPLE 7

Example 1 is repeated, replacing Polyurethane I used in that example by Ebecryl 600—an adduct of acrylic acid with a diglycidyl ether of bisphenol A—available from UCB. The lap shear strengths of the resulting joints with an inserted Ferodo MR 41 brake lining are 5.07 MPa at 24° C. and 2.09 MPa at 200° C.

EXAMPLE 8

Example 1 is repeated, replacing Polyurethane I used in that example by Ebecryl 810, a polyester tetra-acrylate available from UCB. The lap shear strengths of the resulting joints with an inserted Ferodo MR41 brake lining are 4.39 MPa at 24° C. and 1.84 MPa at 200° C.

EXAMPLE 9

Example 1 is repeated, replacing Polyurethane I used in that example by Ebecryl 830, a polyester hexa-acrylate available from UCB. The lap shear strengths of the resulting joints with an inserted Ferodo MR 41 brake lining are 4.26 MPa at 24° C. and 1.77 MPa at 200° C.

EXAMPLE 10

Example 1 is repeated, replacing Polyurethane I used in that example by Ebecryl 230—a higher molecular weight urethane acrylate based on a reaction product of an aliphatic isocyanate-terminated prepolymer and a hydroxyalkyl acrylate—available from UCB. The lapshear strengths of the resulting joints with an inserted Ferodo MR 41 brake lining are 5.71 MPa at 24° C. and 2.03 MPa at 200° C.

What is claimed is:

1. A liquid composition which on exposure to actinic radiation polymerizes to form a heat-curable solid film adhesive, said composition comprising (A) a heat-curable phenol-aldehyde resol resin, (B) a polyurethane acrylate, a polyester acrylate or an acrylated epoxide resin, (C) a photopolymerization initiator for (B) and (D) an at least partially etherified melamine-formaldehyde resin, wherein the heat-curable phenol-aldehyde resin content of said composition consists essentially of said resol resin.

2. A composition according to claim 1, in which (A) is a phenol-formaldehyde resol.

3. A composition according to claim 1, in which (B) is a reaction product of (I) an isocyanate-terminated polyurethane prepolymer with (II) a hydroxyl group-containing acrylic compound.

4. A composition according to claim 3, in which the prepolymer (I) is a reaction product of a polyoxyalkylene glycol with a diisocyanate and the acrylic compound (II) is a hydroxyalkyl acrylate or a hydroxyalkyl methacrylate.

5. A composition according to claim 1, in which (B) is a reaction product of a hydroxyl-terminated polyester with an acrylic compound having a hydroxyl-reactive group which is a carboxyl group, a carboxylic acid halide group or an epoxide group.

6. A composition according to claim 1, in which (B) is a reaction product of a carboxyl-terminated polyester with an acrylic compound having a hydroxyl group or an epoxide group.

7. A composition according to claim 1, in which (B) is an adduct of acrylic acid or methacrylic acid with a polyglycidyl ether of a polyhydric alcohol or of a polyhydric phenol.

8. A composition according to claim 1, which also contains at least one liquid acrylic monomer as reactive diluent.

9. A composition according to claim 1, in which the weight ratio of resol (A) to total photopolymerizable acrylic material is from 1:1 to 10:1.

10. A composition according to claim 1, in which the resol (A) comprises 50 to 90% by weight of the liquid composition, and the photopolymerizable resin (B) comprises 5 to 30% by weight of the resol (A).

11. A composition according to claim 1, which contains an acrylic monomer reactive diluent in an amount up to 30% by weight of the composition.

12. A composition according to claim 1, in which the amount of at least partially etherified melamine-formaldehyde resin (D) in the liquid composition is from 2 to 30% by weight of the composition.

13. A composition according to claim 1 polymerized to a solid heat-curable film adhesive by exposure to actinic radiation.

* * * * *